United States Patent [19]
Nagano et al.

[11] Patent Number: 5,446,977
[45] Date of Patent: Sep. 5, 1995

[54] CYCLING SHOE HAVING A SOLE WITH A REMOVABLE PORTION

[75] Inventors: Masashi Nagano; Shinpei Okajima, both of Izumi, Japan

[73] Assignee: Shimano Inc., Osaka, Japan

[21] Appl. No.: 348,132

[22] Filed: Nov. 23, 1994

Related U.S. Application Data

[63] Continuation of Ser. No. 117,646, Sep. 8, 1993, abandoned, which is a continuation of Ser. No. 841,294, Feb. 28, 1992, abandoned, which is a continuation of Ser. No. 586,522, Sep. 21, 1990, abandoned.

[30] Foreign Application Priority Data

Jan. 16, 1990 [JP] Japan .................................. 2-2922 U
Jan. 16, 1990 [JP] Japan .................................. 2-7522
Jan. 30, 1990 [JP] Japan .................................. 2-8412 U

[51] Int. Cl.6 .............................................. A43B 5/00
[52] U.S. Cl. ...................................... 36/131; 36/15; 36/135; 36/31
[58] Field of Search ................ 36/135, 131, 129, 15, 36/59 B, 43, 100, 101, 134, 31, 61, 62, 67 A, 127, 142 EU, 142 P, 142 RS, 146 B, 146 BR

[56] References Cited

U.S. PATENT DOCUMENTS

| 1,831,851 | 11/1931 | Everett | 36/127 |
| 2,528,951 | 11/1950 | Epsztejn | 36/15 |
| 3,552,041 | 7/1971 | Batchelder et al. | 36/43 |
| 3,987,510 | 10/1976 | Sbicca | 12/142 EV |
| 4,010,558 | 3/1977 | Slusher | 36/127 |
| 4,055,005 | 10/1977 | Meinhart | 36/135 |
| 4,222,182 | 9/1980 | Sears | 36/44 |
| 4,509,510 | 4/1985 | Hook | 128/25 R |
| 4,570,363 | 2/1986 | Annoui | 36/117 |
| 4,685,224 | 8/1987 | Anger | 36/43 |
| 4,783,911 | 11/1988 | Brown | 36/115 |
| 4,807,372 | 2/1989 | McCall . |  |
| 4,893,420 | 1/1990 | Bezin et al. | 36/131 |
| 4,897,937 | 2/1990 | Miscuich et al. | 36/43 |
| 4,907,355 | 3/1990 | Allen et al. . |  |

FOREIGN PATENT DOCUMENTS

0298139 1/1989 European Pat. Off. .
224624 11/1924 United Kingdom .
401979 11/1933 United Kingdom .

*Primary Examiner*—Steven N. Meyers
*Assistant Examiner*—Thomas P. Hillard
*Attorney, Agent, or Firm*—Dickstein, Shapiro & Morin

[57] ABSTRACT

A cycling shoe having a bottom sole. The bottom sole includes a plate member having a cleat-attaching portion and a cover member for covering at least a cleat-attaching area including the cleat-attaching portion and its periphery of the plate member. A portion of the cover member overlapping the cleat-attaching area is rendered removable.

20 Claims, 8 Drawing Sheets

CYCLING SHOE HAVING A SOLE WITH A REMOVABLE PORTION

This application is a continuation-in-part of application Ser. No. 08/117,646 filed Sep. 8, 1993, now abandoned, which is a continuation of application Ser. No. 07/841,294 filed Feb. 28, 1992, now abandoned, which is a continuation of application Ser. No. 07/586,522 filed Sep. 21, 1990, now abandoned.

BACKGROUND OF THE INVENTION

1. Field of the Invention

The present invention relates to a cycling shoe having, at a bottom portion thereof, a plate member with a cleat-attaching portion.

2. Description of the Related Art

There is known a cycling shoe of the above type including a cleat-attaching area having a cleat-attaching hole formed in the plate member and its peripheral portion, with the cleat-attaching portion being exposed to the ambience. Then, for use with a cleat-fastening type pedal, a cleat is attached to the cleat-attaching portion of the shoe. Whereas, for use with a different type of pedal, such as a so-called toe-clip type pedal, the cleat must be detached from the shoe; otherwise, the cleat will interfere with a pedalling action of the cyclist.

However, if the above cycling shoe is used without the cleat, there arises inconvenience in the walking action of the cyclist that sand or the like will intrude through the exposed cleat-attaching hole into the interior of the shoe. Therefore, the cylist should get ready the two types of shoes: one type using the cleat and the other type not using the cleat. This is very inconvenient not only for the cyclist but also for the manufacture.

Moreover, with the above-described conventional cycling shoe, there occurs another problem that an insole placed over the upper face of the middle sole is easily displaced when the cyclist puts his foot into the shoe. Incidentally, almost all cycling shoes usable with a cleat suffer this problem.

SUMMARY OF THE INVENTION

With view to the above-described state of the art, a first object of the present invention is to provide a cyclying shoe selectively usable with a cleat, the invention's shoe being easy to manufacuture as well.

A second object of the invention is to provide a cycling shoe having a plate member formed by a middle sole and a cover member formed integrally with a bottom sole, the shoe permitting accurate yet easy positioning between a cleat-attaching area of the middle sole and its corresponding portion of the bottom sole.

A third object of the invention is to provide a cycling shoe having a plate member formed by a middle sole and a cover member formed integrally with a bottom sole, the shoe being capable of effectively resisting displacement of an insole e.g. when a cyclist puts his foot into the shoe.

For accomplishing the first object, a cycling shoe according to the present invention comprises: a bottom sole including a plate member having a cleat-attaching portion and a cover member for covering at least a cleat-attaching area including the cleat-attaching portion and a periphery thereof of the plate member, a portion of the cover member overlapping the cleat-attaching area being removable.

With the above-described first characterizing feature of the invention, because of the cover member for covering at least a cleat-attaching area including the cleat-attaching portion and its periphery of the plate member, the cyclist can walk comfortably without intrusion of sand or the like through the cleat-attaching hole. Further, since a portion of this cover member overlapping the cleat-attaching area is rendered removable, with removal of this cover member portion, the cleat-attaching portion is exposed to the ambience thus allowing the cyclist to use the cleat.

Therefore, according to the present invention, it is no longer necessary for the manufacturer to make two types of shoes: one type being for use with a cleat-fastening type pedal and the other type being for use with a pedal not using a cleat. Moreover, the invention's shoe can be manufactured easily and economically with only one additional manufacturing process for providing the cover member even when the cover portion is formed as a separate entity from e.g. the plate member.

In embodiments of the present invention, many varied constructional modifications will be readiy possible. Some of such alternate constructions will be specifically described next.

First, by appropriately controlling an amount of adhesive agent, it becomes possible to positively differentiate the strength of adhesive connection between the removable portion of the cover member and the plate member from the remaining portion; that is, to render the former connection much weaker than the latter or even to leave the former un-bonded at all. This arrangement will further facilitate the removal of the removable portion of the cover member.

Further, if the cover member includes visual confirmation means for enabling visual confirmation of the border of the removable portion, the user will feel even greater ease in removing this portion. One feasible embodiment of this visual confirmation means is a recess defined in the bottom sole side of the cover member for reducing the thickness of this cover member portion.

Also, if the plate member is formed by a middle sole and the cover member is formed integrally (but not necessarily of the same material) with a bottom sole which is formed of elastic material, the additional process merely for providing the cover member becomes no longer necessary, so that the manufacturing costs will be further reduced. Moreover, the intrusion of sand or the like can be avoided more reliably.

For accomplishing the second object, in the cycling shoe having the above-described first characterizing features of the invention, the plate member comprises the middle sole while the cover member comprises a bottom sole made of elastic member, with either the bottom sole or the middle sole including a projection while the other including a hole engageable with the projection so that the bottom sole and the middle sole can be positioned relative to each other through engagement between the projection and the hole.

With this second feature of the invention, the positioning operation between the bottom sole and the middle sole can be effected accurately and yet easily through the engagement between the projection and the hole even in the presence of some manufacturing tolerances in these bottom and middle soles. Especially, according to the aforementioned characterizing features of the present invention, the overlapping portion of the bottom sole covers the cleat-attaching area of the middle sole, thus disabling visual confirmation of the positioning between the cleat-attaching area of the middle sole and the bottom sole, and therefore, the above-described third feature of the invention will prove particularly useful.

For accomplishing the third object, according to a third feature of the invention, an insole is removably placed over a top face of the middle sole, said insole having an anti-displacement unevenness in its face coming into contact with the top face of the middle sole.

With the above third feature of the invention, the anti-displacement unevenness prevents inadvertent displacement of the removable insole inside the shoe, thus providing the cyclist with snug feel when he puts on and takes off the shoe and also when he pedals the bike with the shoes on. Incidentally, many cleat-attaching type cycling shoes employ a removal insole so that the insole can be removed to allow attachment or detachment of cleat-attaching metal elements or the like from the inside of the shoe when and if necessary. In such case, this fourth feature of the present invention will prove particularly advantageous.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate preferred embodiments of a cycling shoe relating to the present invention; in which, FIGS. 10 through 16 illustrate a further embodiment of the present invention; in which.

DESCRIPTION OF THE PREFERRED EMBODIMENTS

Preferred embodiments of the present invention will now be described in particular with reference to the accompanying drawings.

Figure 9:
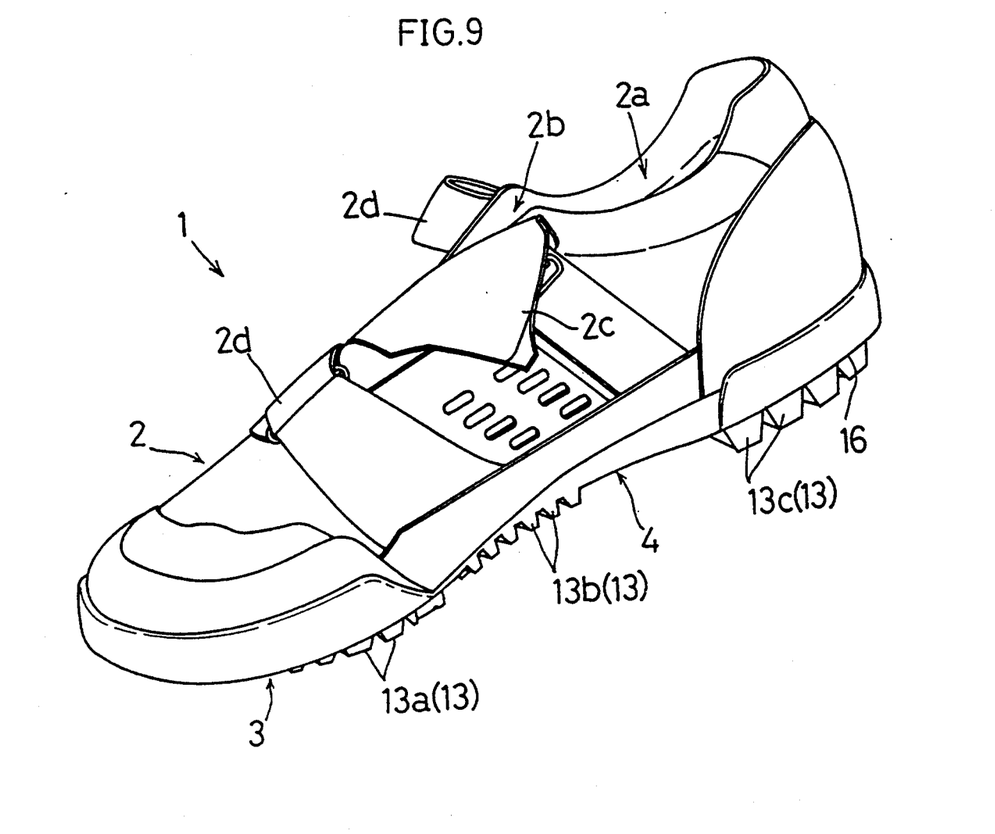
FIG. 9 is a perspective view of the cycling shoe.

Referring first to FIG. 9, a cycling shoe 1 includes a peripheral portion 2 and a sole 3. The peripheral portion 2 includes an inserting opening 2a through which a cyclist's foot is inserted, a cutout 2b provided at a position corresponding to an instep side of the cyclist's foot as being inserted in the opening 2a so as to provide the opening 2a with a longitudinal extension for facilitating the insertion of the foot into the opening 2a. The peripheral portion 2 further includes a tongue 2c for covering an upper region of the cutout 2b for preventing intrusion of sand or the like into the interior of the shoe and two fastener belts 2d with a VELCRO brand hook and loop type fastening system for fastening the instep side of the foot to the shoe by pressing the tongue 2c from the above.

Figure 3:
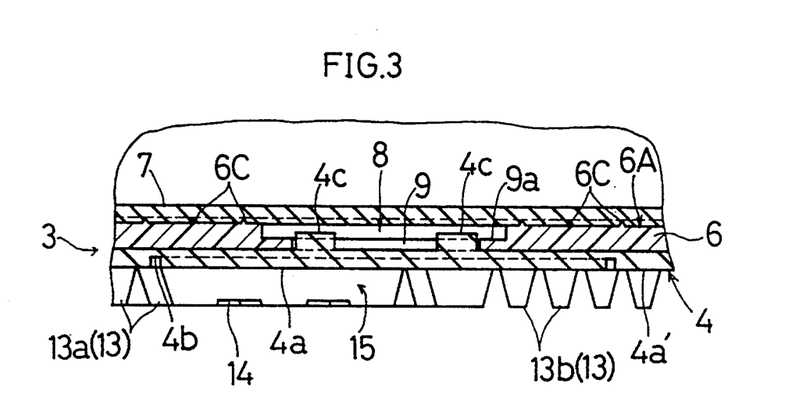
FIG. 3 is a section view showing major portions.
Figure 7:
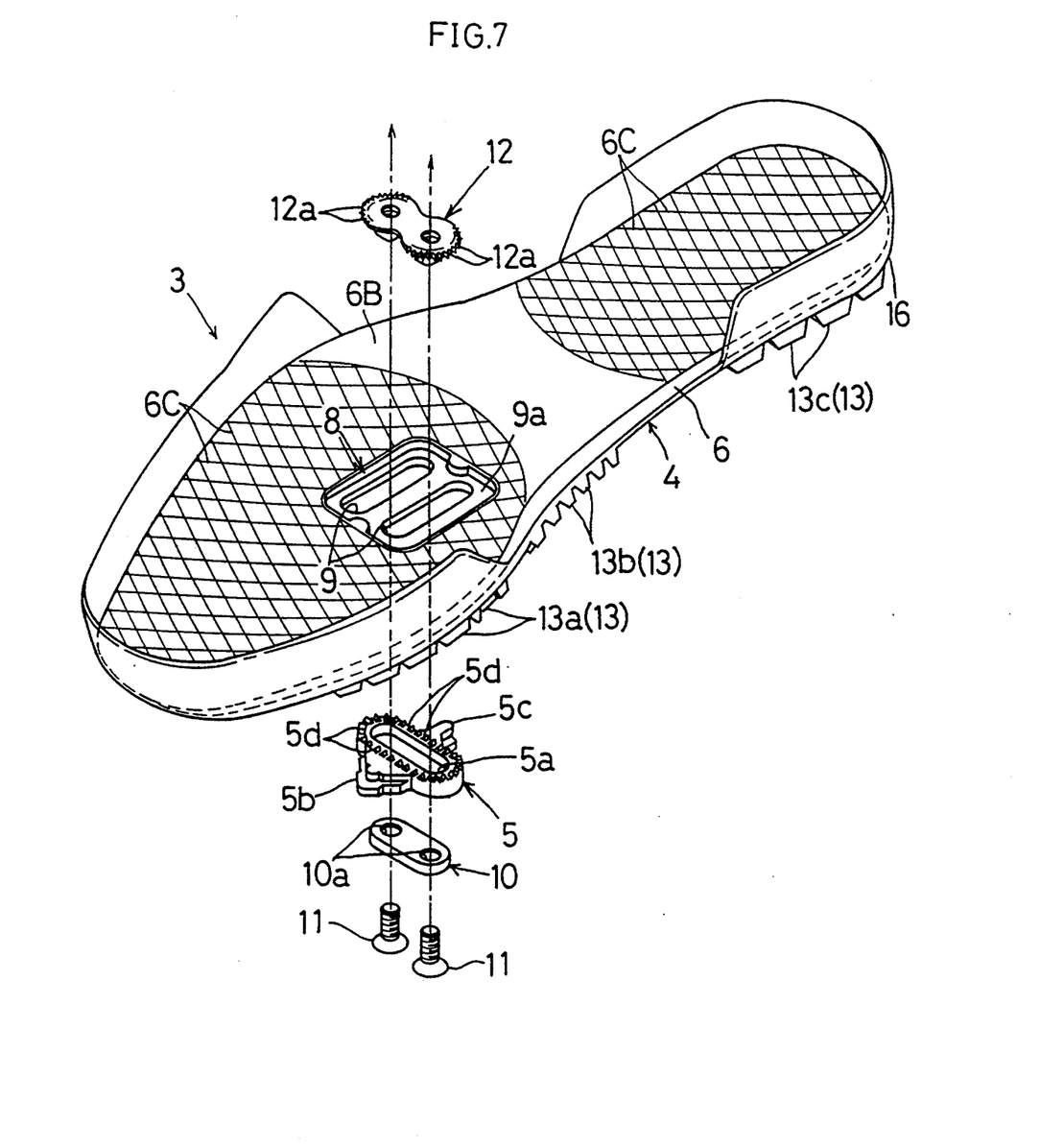
FIG. 7 is an exploded perspective view of the cleat.
Figure 8:
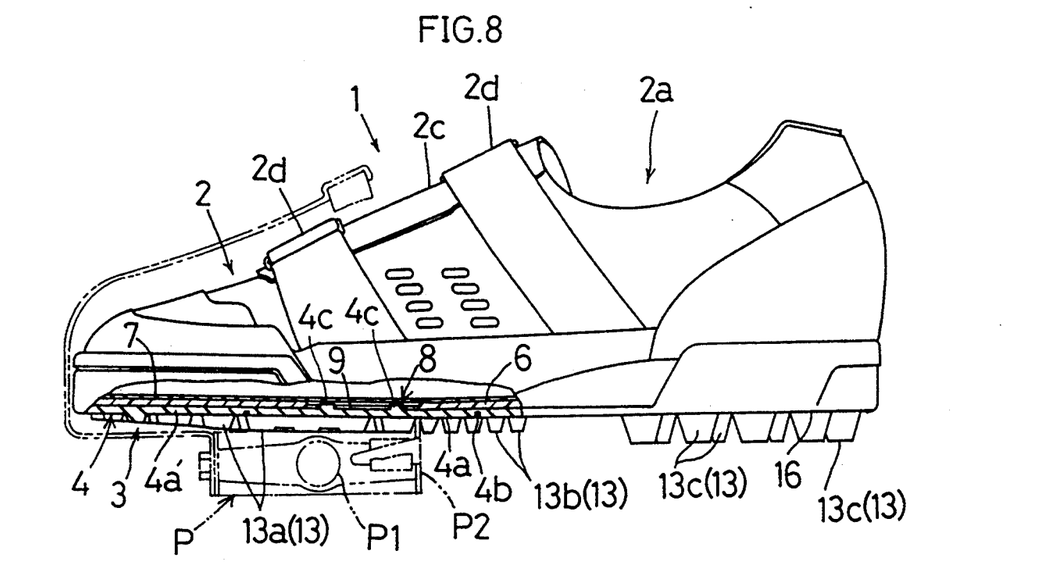
FIG. 8 is a side view showing relationship between the cycling shoe and the bicycle pedal.

The sole 3, as shown in FIGS. 3 and 7, includes a bottom sole 4 made of elastic resin such as rubber material, a middle sole 6 made of hard resin and disposed over the bottom sole 4 for attaching a cleat 5 thereto, and an insole 7 disposed over the middle sole 6.

Figure 5:
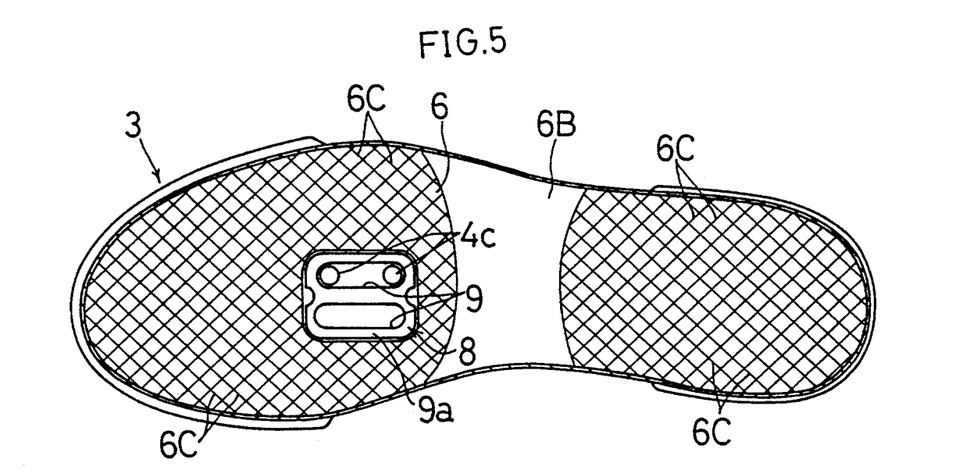
FIG. 5 is a plan view showing line-like projections formed on an upper face of a middle sole.

As shown in FIGS. 3 and 5, in an upper face 6A of the middle sole 6 except for a foot-arch portion 6B, there are formed a plurality of line-like projections 6C arranged in a grating-like formation so as to prevent inadvertent displacement of the insole 7 inside the shoe 1. Each line-like projection has a rectangular cross section having the projection 6C at its top, so that the pointed leading ends of the projections 6C may sink into the insole 7. Further, the respective line-like projections 6C are disposed with a slope of about 45 degrees on the right and left sides of the longitudinal axis of the shoe 1 and the lines of the projections 6C are equidistantly disposed with each other.

Figure 4:
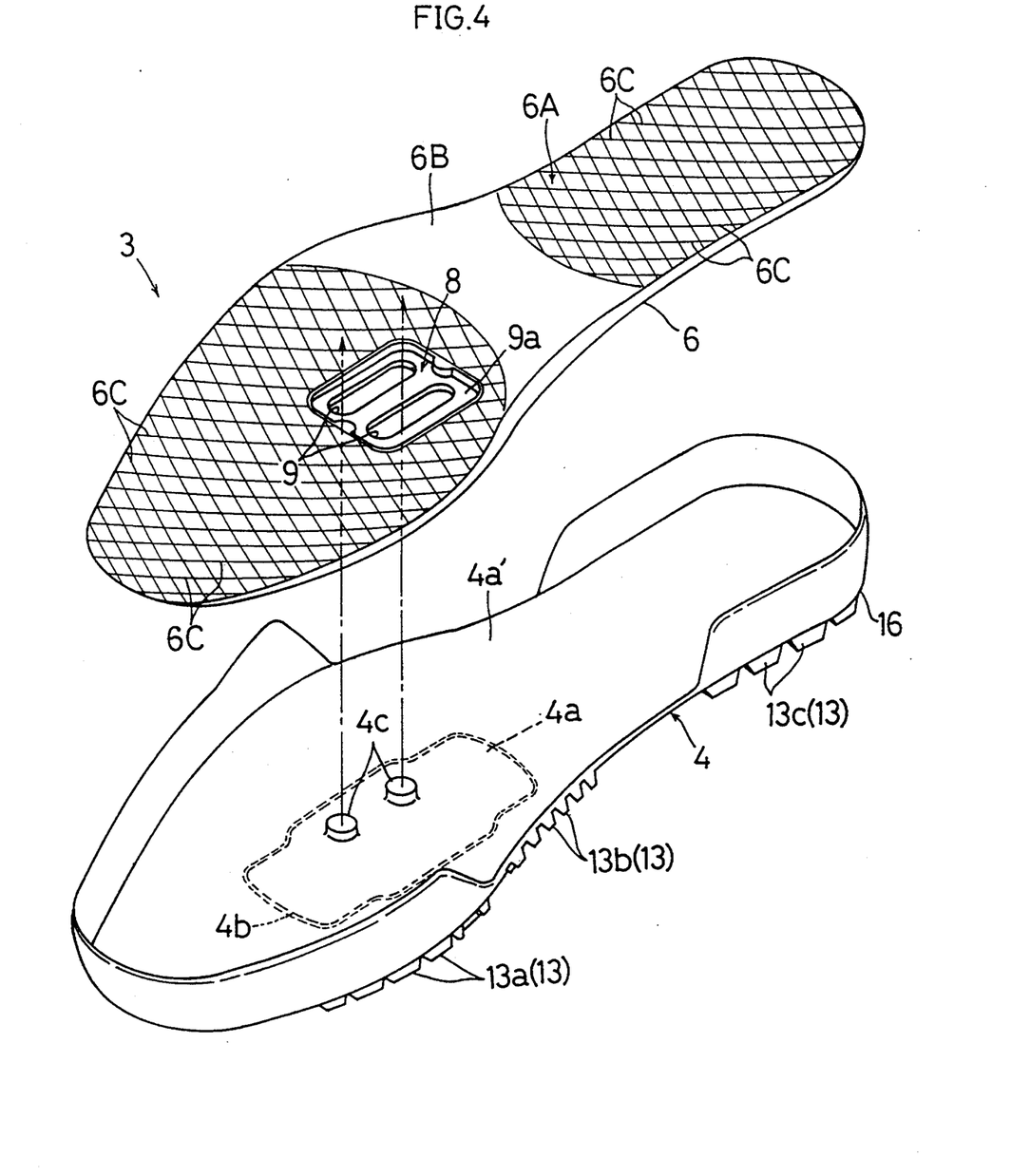
FIG. 4 is a perspective view showing positioning projections formed on a cover portion of a shoe sole.

As shown in FIGS. 1 through 5, the middle sole 6 includes, as a cleat-attaching portion, a pair of elongated slots 9, 9 extending along the longitudinal direction of the shoe 1 between the toe and the heel portions thereof. These elongated slots 9, 9 are disposed substantially in parallel with each other in the lateral direction of the shoe 1. Accordingly, a cleat 5 is attached to the shoe 1 by means of bolts 11, 11 engageable with the elongated slots 9, 9. That is, the cleat-attaching portion and a region around this portion within which an attaching position of the cleat 5 is adjustable together comprise a cleat-attaching area 8. Moreover, each elongated slot 9 has a width slightly greater than a diameter of the bolt 11. Further, as shown in FIG. 4, in an upper face of the middle sole 6 adjacent the elongated slots 9, 9, there is formed a concave portion 9a for receiving the nut 12 therein so as to prevent the nut 12 from projecting into abutment against the sole of the cyclist's foot.

Figure 1:
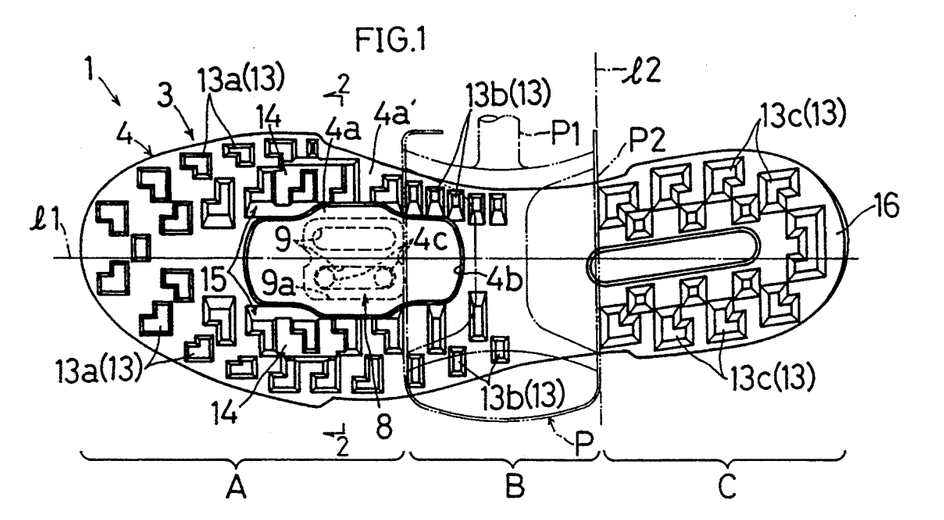
FIG. 1 is a bottom view of a cycling shoe according to one embodiment of the invention.
Figure 2:
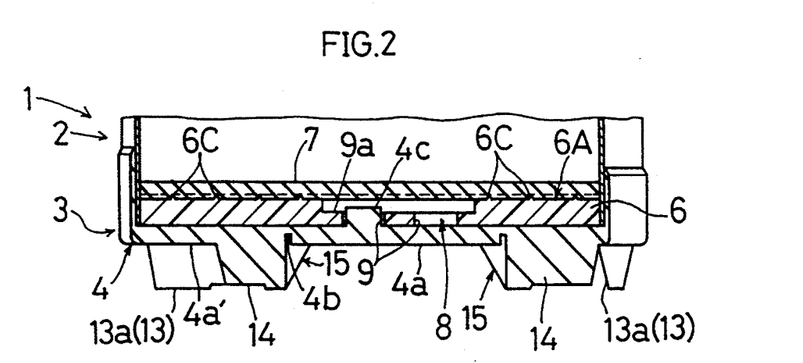
FIG. 2 is a section view taken along a line 2—2 of FIG. 1.
Figure 6:
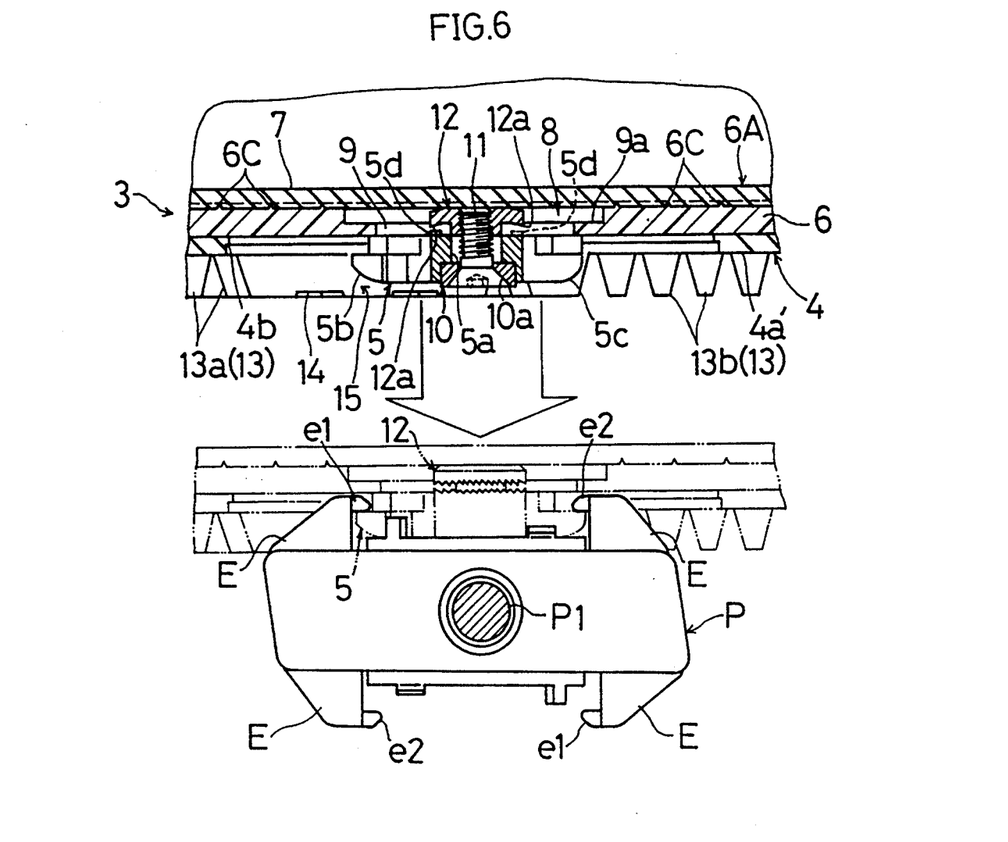
FIG. 6 is a section view showing engaging relationship between a cleat and a pedal of a bicycle.

As shown in FIGS. 1 through 3, at a portion of the bottom sole 4 between a cover portion 4a (a part of a cover member) overlapping the cleat-attaching portion of the middle sole 6 and a remaining portion 4a', there is formed a bordering recess portion 4b having a reduced thickness compared with the portions 4a and 4a'. More particularly, as shown in FIGS. 1 and 3, the recessed cleat-attaching area 8 shown in FIG. 6 is covered with the cover portion 4a formed integrally with and of the same material as the remaining portion 4a' immediately after the shoe 1 has been manufactured. Then, for attachment of the cleat 5 to the sole 4, a cutting operation is carried out, by means of a knife e.g., along the bordering recess portion 4b to remove the cover portion 4a thus exposing the recessed, cleat-attaching area 8 to the ambience as illustrated in FIG. 1. That is to say, this cycling shoe 1 can be used with both one type of bicycle using the cleat 5 for attaching the shoe 1 via the cleat 5 to the pedal P and another type of bicycle, e.g. a toeclip type which does not use the cleat 5. Incidentally, it should be convenient that the portion of the bottom sole 4 surrounded by the bordering recess portion 4b is provided with a color different from that of the remaining portion so as to help visual confirmation of the user who is to effect the above-described cutting operation. Further, it is also conceivable, for helping the removal operation, to provide less secure bonding between the cleat-attaching portion of the middle sole 6 and the cover portion 4a or maintain these un-bonded with each other.

As shown in FIGS. 1 through 4, there are formed, at predetermined positions on the upper face of the cover portion 4a, two projections 4c engageable with opposed ends of either of the elongated slots 9. These projections 4c are used for fixing relative positions between the cover portion 4a and the elongated slots 9, 9 when the bottom sole 4 and the middle sole 6 are to be bonded with each other. That is, with these projections, it becomes possible to prevent any portion of the bottom sole 4a' except the cover portion 4a from overlapping the cleat-attaching area 8 even when there occurs some manufacturing error in the dimensions of the bottom sole 4 and the middle sole 6.

The cleat 5 to be attached to the cleat-attaching area 8, as shown in FIGS. 6 and 7, is comprised of a cylindrical metal body having an elongated slot 5a at a center portion thereof and a pair of stopper projections 5b and 5c disposed at short-diameter sides of the slot 5a. Then, for attachment of this cleat 5, an elliptical base metal 10 having a major axis shorter than the elongated slot 5a is fitted on the above-described cleat body; then, from the back face of the sole 3, a pair of attaching bolts 11, 11 are inserted through a pair of bolt inserting holes 10a and 10b formed in the base metal 10 and also the elongated slots 9, 9 formed in the middle sole 6, so that the stopper projections 5b and 5c are aligned along the longitudinal direction of the shoe 1. Thereafter, the cleat body and the middle sole 6 are securely bolted with each other by means of a guitar-shaped nut 12.

According to the above-described construction, adjustment of cleat attaching position in the vertical direction can be effected by moving the entire cleat 5 along the elongated slots 9, 9 in the longitudinal direction of the shoe 1. Further, adjustment of cleat attaching position in the lateral direction can be effected by moving the entire cleat 5 relative to the base metal 10 in the sidewise direction of the shoe 1. In this way, since the cleat 5 is directly attached to the middle sole 6, this attachment of the cleat 5 directly to the middle sole 6 is much superior in strength than attachment of the same to the bottom sole 4. Incidentally, reference numerals 5d and 12a denote anti-displacement projections for preventing inadvertent displacement of the cleat 5 relative to the middle sole 6.

As shown in FIGS. 1 and 2, on the bottom face of the bottom sole 4, there are formed an appropriate number of anti-slip projections 13 and also, integrally with the anti-slip projections 13, there are formed a pair of right and left reinforcing portions 14 disposed on the right and left sides of the cleat-attaching area 8 for reinforcing the same. These reinforcing portions 14 are formed integrally with and of the same material as the entire bottom sole 4 by e.g. an injection molding method. As these reinforcing portions 14 are disposed at an area corresponding to the ball of the user's foot and/or to a foot portion forwardly of the ball where the shoe 1 can flex most easily during a walking action, so that the periphery of this area of the shoe can be reinforced against repeated flextion of the shoe. Further, since the shape of the sole is changed gradually relative to the periphery of the reinforcing portions 14, there occurs little concentration of load on the same.

That is, the above-described construction can effectively prevent deterioration in the strength of the cleat-attaching area 8 per se due to the formation of the recessed cleat-attaching area 8 in the bottom sole 4 and also to the formation of the elongated slots 9, 9 in the middle sole 6. Moreover, since the cleat 5 (which will not flex during a walking action) is connected by means of the bolts 11, 11 and the nut 12, it becomes possible to relieve the large load acting on these connections by rendering the periphery of the sole 3 about the connections less flexible than the rest of the sole 3.

Further, each reinforcing portion 14 also has the projections 13 on its surface and has a slightly increased thickness to such an extent as not to project beyond the projections 13 in order to avoid deterioration of the ground-gripping force of the sole in this portion. Further, the projections 13 around the cleat-attaching area 8 are projected with a downward extension relative to the lower face of the cleat 5 so that the cleat 5 will not directly contact the ground face when the user walks with the cleat 5 attached to the shoe. Incidentally, the reinforcing portion 14 acts also for reinforcing the projections 13 against deformation due to vertical loads acting thereon.

In FIG. 6, a reference mark E denotes an engaging member which comes into engagement with the cleat 5 with the rider's stepping action on the pedal P so as to prevent erroneous detachment of the shoe 1 from the pedal P. More specifically, this engaging member E includes, at a leading end thereof, stopper claws e1 and de2 which come into engagement respectively with the stopper projections 5b and 5c of the cleat 5, and through this engagement erroneous detachment of the shoe 1 from the pedal P can be prevented. Further, in the above-described rider's pedal stepping action, for smoothly guiding the engaging member E to the cleat-attaching area 8, peripheral guide faces 15, 15 are formed along portions of the reinforcing portions 14 and those of the anti-slip projections 13 on the portions 14 facing the cleat-attaching area 8. Each guide face 15, as illustrated in FIG. 2, is so formed as to be gradually inclined towards the lateral side of the shoe 1 as the face 15 projects from the shoe sole. These guide faces 15 serve also to facilitate the aforementioned knife cutting operation to remove the cover portion 4a as the faces 15 allow substantially vertical positioning of the knife as being used for the cutting operation.

Further, the anti-slip projections 13, as illustrated in FIG. 1, are formed differently in a first region A at the leading end of the shoe 1, a second region B corresponding to the arch of the rider's foot and its vicinity and in a third region C corresponding to the heel of the rider's foot, respectively.

More particularly, the projections 13 in the first region A are formed as first projections 13a each having a hooked shape in the plan view and having its one side directed in parallel with the longitudinal direction of the shoe 1 and its other side directed normal to the same. Then, a plurality of these first projections 13a are arranged in a checkerboard-like format in the longitudinal and lateral directions of the shoe 1 so that a group of the projections 13a aligned in the lateral direction forms one continuous line as being viewed from one lateral side of the shoe 1. With this arrangement, in the case of a toe-clip type pedal bicycle, the rider can put his foot into the toe-clip without the first projections 13a interfering with an edge of a pedal side plate P2 positioned in parallel with a pedal axis P1. Also, the projecting amount of the first projections 13a is caused to gradually decrease as approaching the toe end portion of the shoe 1.

The projections 13 in the second region B are formed as second projections 13b engageable with the edge of the pedal side plate P2. Accordingly, as these second projections 13b come into engagement with the edge of the pedal side plate P2 with a rider's stepping action onto the pedal P, the shoe 1 will not be displaced inadvertently from the pedal P.

The projections 13 in the third region C, i.e. a heel 16 of the shoe, are formed as third projections 13c. The projecting amount of these third projections 13c is greater than those of the first and second projections 13a and 13b so as to increase the height of the heel 16 relative to the rest of the shoe.

Further, the front ends, i.e. foot-arch side ends of the third projections 13c and all the second projections 13b are aligned along a second reference line l 2 generally normal to a first reference line l 1 connecting between the center of the width of the heel and that of the toe. According to this arrangement, when the second projections 13b and the front ends of the third projections 13c come into engagement with the pedal side plate P2 with the rider's stepping action onto the pedal P, the first reference line l 1 becomes aligned along a plane generally parallel with a rotational plane of the crank arm of the bicycle, thus preventing the toe from coming more inwardly than the rotational plane of the crank arm. Consequently, the rider can effect smooth and comfortable pedalling action without having to awkwardly direct his toe outwards.

In summary, the projections 13 serve not only as anti-slipping means when the rider dismounts the bike and walks on the ground but as positioning means for positioning the shoe 1 relative to the non-cleat attaching type pedal P.

Some alternate embodiments will be specifically described next.

Figure 10:
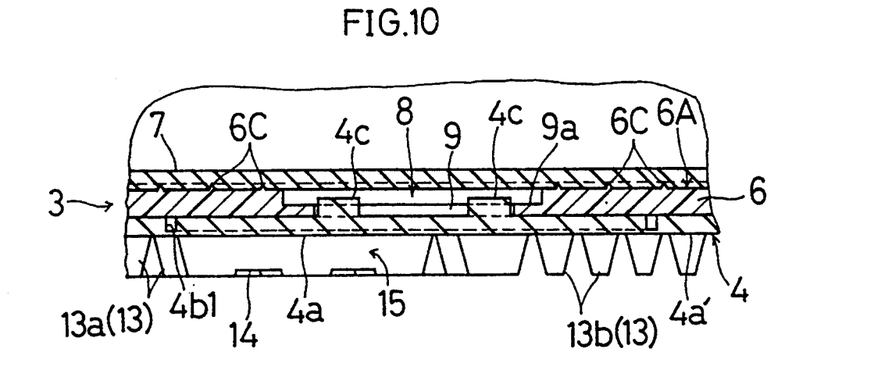
FIGS. 10 through 12 are views showing a bordering recess portion and corresponding to FIG. 3 of the foregoing embodiment.
Figure 11:
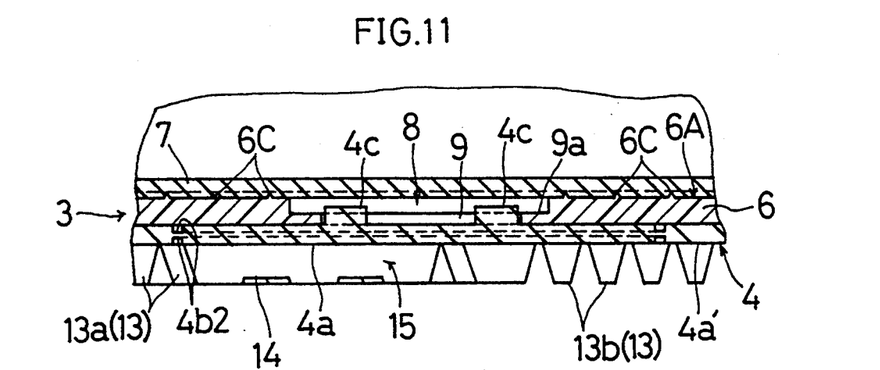
Figure 12:
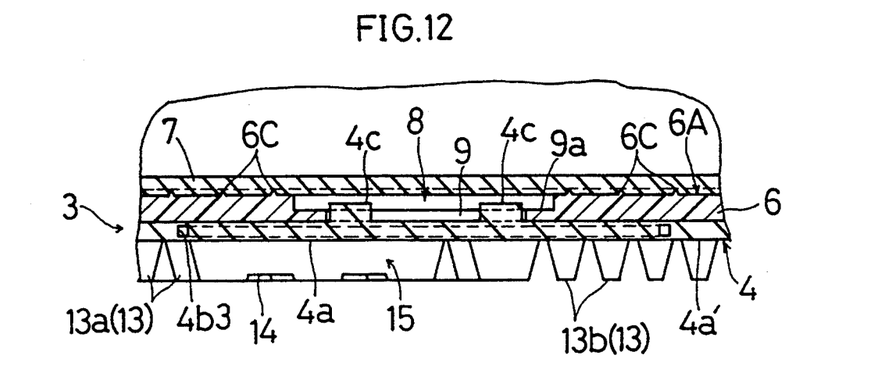

I. In the foregoing embodiment, the bordering recess portion 4b is formed in the lower face of the bottom sole 4. Instead, as shown in FIG. 10, a bordering recess portion 4b1 can be formed in the upper face of the bottom sole 4. Further alternately, as shown in FIG. 11, a pair of vertically aligned bordering recess portions 4b2 can be formed in both the upper and lower faces of the bottom sole 4. Or, still further alternately, as shown in FIG. 12, a bordering recess portion 43b can be formed as a hollow portion inside the bottom sole 4. Moreover, it is conceivable to form all of the both of or either of the upper and lower faces of the cover portion 4a thinner than the remaining portion 4a' adjacent the cover portion 4a of the bottom sole 4. Incidentally, in the case of the constructions of FIGS. 10 and 12, as described hereinbefore, it is desired that the cover portion 4a can be readily distinguishable by sight from the lower face of the bottom sole 4.

II. In the foregoing embodiment, the cover portion 4a and the remaining portion are connected through the entire periphery of the former. Instead, it is also conceivable to form a cutout in the border between these portions for futher facilitating the knife-cutting removal operation of the cover portion 4a.

III. In the foregoing embodiment, the entire shoe sole is formed as a double-layered construction consisting of the bottom sole 4 and the middle sole 6. However, there will occur no inconvenience in use even if only the cleat-attaching area 8 and its periphery have such double-layered construction.

IV. It is conceivable to provide a separate cover member engageable with the cleat-attaching area 8 after removal of the cover portion 4a from the same, so that the cover member can again cover the cleat-attaching area 8 through the elongated slots 9, 9.

V. In the foregoing embodiment, the reinforcing portions 14 are formed integrally with and of the same material as the bottom sole 4. Instead, the reinforcing portions 14r can be formed of a different material.

Figure 13:
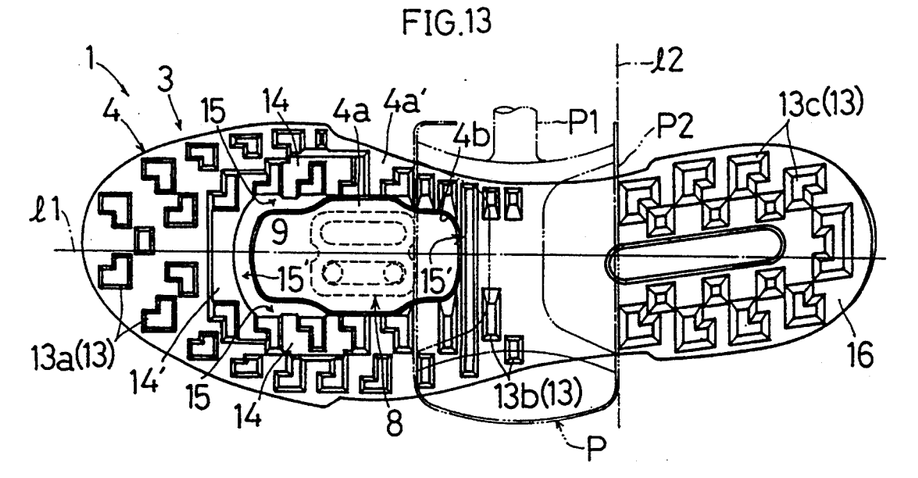
FIG. 13 is a view showing guide faces provided at reinforcing portions and corresponding to FIG. 1 of the foregoing embodiment.

VI. In the foregoing embodiment, the reinforcing portions 14 are provided only on the right and left sides of the cleat-attaching area 8. Instead, as shown in FIG. 13, a further reinforcing portion 14' having a relatively large thickness can be provided on the front side of the cleat-attaching area 8, with further guide faces 15' being formed therewith. This arrangement is advantageous for facilitating positioning of the cleat 5 relative to the pedal P in the longitudinal direction of the shoe 1 as the cleat 5 being guided along the guide faces 15' positioned forwardly and rearwardly of the cleat-attaching area 8.

VII. In the foregoing embodiment, the reinforcing portions 14 are provided on both the right and left sides of the cleat-attaching area 8. However, substantially the same advantageous effect can be achieved even if only one reinforcing portion 14 is provided on either side of the cleat-attaching area 8.

VIII. In the foregoing embodiment, the cleat-attaching area 8 is formed concave by cutting out a portion of the bottom sole 4. Instead, the cleat-attaching area 8 can be formed directly in the bottom sole 4. And, in this case also, substantially the same effect can be achieved by providing the reinforcing portion(s) 14.

IX. In the foregoing embodiment, the middle sole 6 is formed of a hard resin. Instead, the sole 6 can be formed of a leather material. Similarly, the cleat 5 can be formed of a hard resin instead of metal. In this case, in the middle sole 6, the cleat-attaching area 8 is formed of metal and the anti-displacement projections are formed on the face of the area 8 contacting the cleat 5.

X. The projections used for relative positioning between the bottom sole 4 and the middle sole 6 can be alternately from those in the foregoing embodiment. First, it is conceivable to provide four projections respectively engageable with the opposed ends of the elongated slots 9, 9. Second, it is also conceivable to provide two projections engageable with the opposed ends of either one of the elongated slots 9, 9. Third, it is further conceivable to provide one or two projections engageable with the entire slots 9, 9. Also, further holes, separately from the cleat-attaching elongated slots 9, 9, can be provided, with the projections being formed in the middle sole 6 while the corresponding holes being formed in the bottom sole 4.

XI. In the foregoing embodiment, the anti-slip projections on the upper face 6A of the middle sole 6 are formed as the line-like projections 6C. These anti-slip projections can be formed alternately as a dispersed plurality of dot-like projections. Further, various modifications will be obvious for those skilled in the art in the cross sectional shape and angular orientation of the line-like anti-slip projections.

XII. In the foregoing embodiment, the third projections 13c are so designed as to increase the height of the heel 16 of the shoe 1. Instead, if the height of the entire heel 16 is increased, the front ends of the heel 16 adjacent the foot arch portion should be disposed along the second reference line 2. Further, the third projections can be provided forwardly or rearwardly of a line connecting the front ends.

Figure 14:
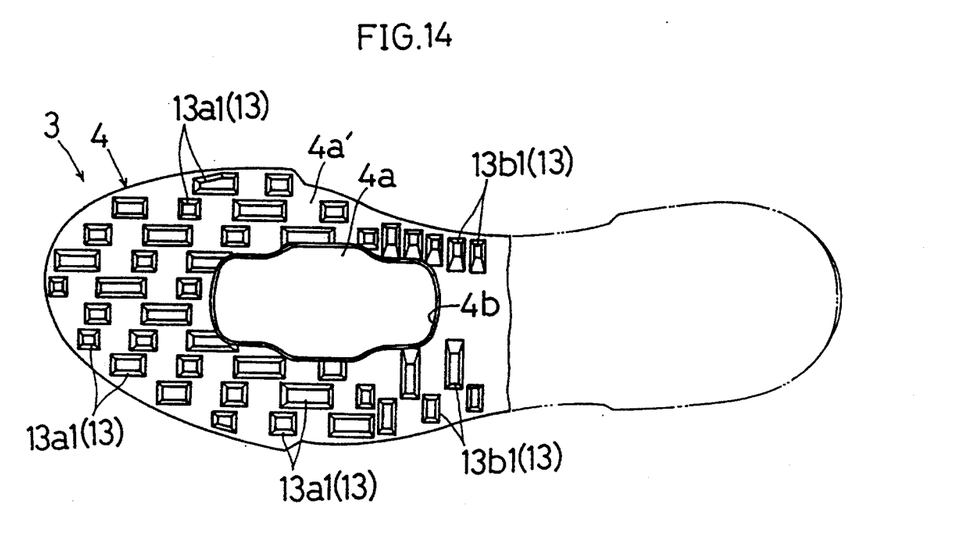
FIGS. 14 through 16 are bottom views showing anti-slip projections formed on the shoe sole, respectively.
Figure 15:
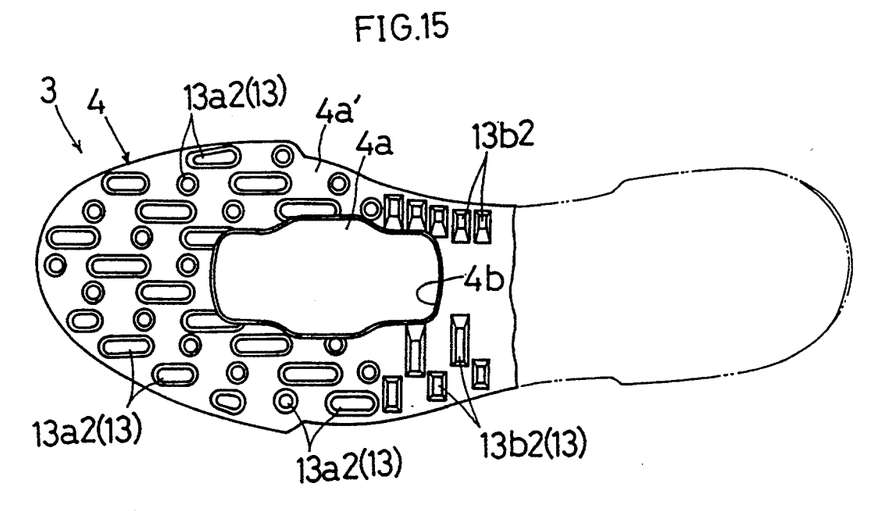
Figure 16:
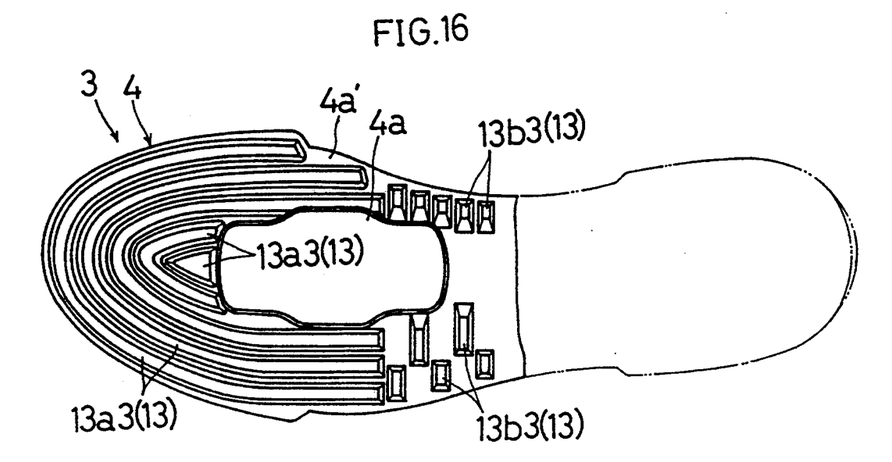

XIII. In the foregoing embodiment, each of the first projections has a hook-like cross section. Instead, the first projection can have a square cross section as those denoted by marks 13a1, 13b1 in FIG. 14, or a circular cross section as those denoted by marks 13a2, 13b2 in FIG. 15. Still alternately, the first projections can be formed as a plurality of continuous line-like projections formed along with each other. Further, alternately, the first projections can be formed in a grating-like arrangement.

XIV. In the foregoing embodiment, the cover portion 4a is formed integrally with the bottom sole 4. Instead, it is also conceivable to form the cover portion 4a and a part of its pheriphery as a cover member provided separately from the bottom sole 4. This cover member can be formed of any material which harndess permits cutting of the cover portion 4a.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A cycling shoe with a sole, the cycling shoe being usable with a cleat which is securely connectable to a bicycle pedal, wherein the sole comprises:
   a plate member with (1) a cleat-attaching area and (2) cleat-attaching means for attaching the cleat to the cycling shoe, the cleat-attaching means being located at the cleat-attaching area, wherein the cleat attaching means comprises a hole which extends through the plate member; and
   a cover member for covering at least the bottom of the cleat-attaching area, the cover member comprising a removable portion which is opposed to the cleat-attaching means, the removable portion being removable from outside of the shoe, wherein the removable portion comprises a projection which fits into the hole to position the removable portion relative to the plate member.

2. A sole for a cycling shoe, the sole comprising:
   a midsole which includes a cleat-attaching means for attaching a cleat to the cycling shoe, said midsole having a bottom surface; and
   a bottom sole which includes:
      a main portion for covering the midsole, said main portion being adhesively bonded to at least a portion of said bottom surface of said midsole, and
      a removable portion for covering the cleat-attaching means so that foreign material is prevented from reaching to the cleat-attaching means from outside the shoe, and wherein the removable portion is integrally molded together in one piece with said main portion, is removable from the main portion, and has distinguishing means for distinguishing, from outside of the shoe, the removable portion from the main portion.

3. A shoe sole according to claim 2, wherein said midsole has a toe end, said main portion of said bottom sole being affixed to said midsole in a region between said toe end and said cleat-attaching means.

4. A shoe sole according to claim 3, wherein the removable portion of the bottom sole is generally thinner than the main portion of the bottom sole.

5. A shoe sole according to claim 4, wherein the bottom sole defines a cleat-receiving space with a bottom for receiving the cleat, the cleat-receiving space being surrounded by the main portion of the bottom sole, the removable portion of the bottom sole being located at the top of the cleat-receiving space.

6. A shoe sole according to claim 4, wherein the removable portion of the bottom sole has a periphery, and wherein a downwardly open groove is formed along the periphery of the removable portion.

7. A shoe sole according to claim 3, wherein the bottom sole covers substantially all of the bottom surface of the midsole.

8. A shoe sole according to claim 7, wherein the main portion of the bottom sole comprises an elastic member for contacting the ground.

9. A shoe sole according to claim 3, wherein the removable portion is not bonded to the midsole.

10. A shoe sole according to claim 3, wherein the cleat-attaching means comprises a hole which extends through the midsole.

11. A shoe sole according to claim 3, wherein the midsole has an upper face, and wherein the shoe sole further comprises an insole which is removably located on top of the upper face of the midsole, and anti-displacement means for preventing inadvertent displacement of the insole with respect to the midsole.

12. A shoe sole according to claim 11, wherein the anti-displacement means is formed by projections which are formed on the upper face of the midsole.

13. A shoe sole according to claim 12, wherein the projections are line-like projections arranged in a grating-like formation.

14. A shoe sole according to claim 3, wherein said distinguishing means includes means for visually confirming, from outside of the shoe, a border between the removable portion and the main portion of the bottom sole.

15. A shoe sole according to claim 2, wherein the removable portion has an elongated, non-circular periphery.

16. A shoe sole according to claim 15, wherein the removable portion of the bottom sole is thinner than the main portion of the bottom sole.

17. A method of using a cycling shoe sole, the sole comprising: (A) a midsole which includes a cleat-attaching means for attaching a cleat to the cycling shoe, said midsole having a bottom surface; and (B) a bottom sole which includes: (a) a main portion for covering the midsole, said main portion being affixed to at least a portion of said bottom surface of said midsole, and (b) a removable portion for covering the cleat-attaching means so that foreign material is prevented from reaching to the cleat-attaching means from outside the shoe, and wherein the removable portion is integrally molded together in one piece with said main portion, is removable from the main portion, and has means for distinguishing, from outside of the shoe, the removable portion from the main portion, and wherein said midsole has a toe end, said main portion of said bottom sole being affixed to said midsole in a region between said toe end and said cleat-attaching means, the method comprising the steps of:

removing the removable portion of the bottom sole from the cycling shoe; and     then, while the removable portion is removed from the shoe, attaching the cleat to the cycling shoe.

18. A method according to claim 17, wherein said removing step includes the step of removing the removable portion from the main portion of the bottom sole, and wherein said step of attaching the cleat to the cycling shoe occurs while said main portion of said bottom sole is affixed to said midsole.

19. A sole for a cycling shoe, the sole comprising:

a midsole which includes a cleat-attaching means for attaching a cleat to the cycling shoe, and a heel region, said midsole having a bottom surface; and a bottom sole which includes:

a main portion for covering the midsole, said main portion being adhesively bonded to said bottom surface of said midsole, and     a removable portion for covering the cleat-attaching means so that foreign material is prevented from reaching to the cleat-attaching means from outside the shoe, and wherein the removable portion is integrally molded together in one piece with said main portion, is removable from the main portion, and has means for distinguishing, from outside of the shoe, the removable portion from the main portion.

20. A sole for a cycling shoe, the sole comprising:

a midsole which includes a cleat-attaching means for attaching a cleat to the cycling shoe, said midsole having a bottom surface; and a bottom sole which includes:

a main portion for covering the midsole, said main portion being adhesively bonded to at least a portion of said bottom surface of said midsole, and     a removable portion for covering the cleat-attaching means so that foreign material is prevented from penetrating through the cleat-attaching means to the interior of the shoe from outside the shoe, and wherein the removable portion is integrally molded together in one piece with said main portion, is removable from the main portion, and has distinguishing means for distinguishing, from outside of the shoe, the removable portion from the main portion.

* * * * *